United States Patent [19]

Smith

[11] Patent Number: 6,057,276

[45] Date of Patent: *May 2, 2000

[54] GRAFFITI REMOVER WHICH COMPRISES AN ACTIVE SOLVENT, A SECONDARY SOLVENT, AN EMOLLIENT AND A PARTICULATE FILLER AND METHOD FOR ITS USE

[75] Inventor: John Ralph Smith, Gansevoort, N.Y.

[73] Assignee: Decora Incorporated, Fort Edward, N.Y.

[*] Notice: This patent is subject to a terminal disclaimer.

[21] Appl. No.: 09/302,760

[22] Filed: Apr. 30, 1999

Related U.S. Application Data

[63] Continuation of application No. 09/205,802, Dec. 4, 1998, Pat. No. 5,929,005.

[51] Int. Cl.[7] .............................. C11D 9/04; B08B 7/00; C09D 9/00
[52] U.S. Cl. ................. 510/174; 510/200; 510/201; 510/202; 510/212; 510/240; 510/241; 510/366; 510/499; 510/507; 134/38
[58] Field of Search .................................. 510/174, 201, 510/202, 212, 200, 240, 241, 366, 499, 507; 134/38

[56] References Cited

U.S. PATENT DOCUMENTS

| | | | |
|---|---|---|---|
| 4,780,235 | 10/1988 | Jackson | 252/170 |
| 5,346,640 | 9/1994 | Leys | 252/162 |
| 5,509,969 | 4/1996 | Grawe | 134/2 |
| 5,712,234 | 1/1998 | Pourreau | 510/174 |
| 5,736,249 | 4/1998 | Smith et al. | 428/447 |
| 5,929,005 | 7/1999 | Smith | 510/174 |

*Primary Examiner*—Yogendra Gupta
*Assistant Examiner*—Brian P. Mruk
*Attorney, Agent, or Firm*—Hedman, Gibson & Costigan, P.C.

[57] ABSTRACT

This invention provides graffiti removers for removing permanent ink stains from painted surfaces. This graffiti removers include an active solvent for dissolving the stains, which are organic in nature, an optional secondary solvent for concentrated attack on the stain without being adversely affected by dilution with water, an emollient for maintaining a uniform dispersion of particulates in the remover and on the graffiti-stained painted surfaces, and an amorphous, particulate, mildly abrasive filler for imbiding the solvents, the filler being selected to permit the slow release of the active solvent.

10 Claims, No Drawings

GRAFFITI REMOVER WHICH COMPRISES AN ACTIVE SOLVENT, A SECONDARY SOLVENT, AN EMOLLIENT AND A PARTICULATE FILLER AND METHOD FOR ITS USE

This is a continuation, of application Ser. No. 09/205,802 filed Dec. 04, 1998 now U.S. Pat. No. 5,929,005.

This invention relates environmentally friendly compositions for removing graffiti, especially permanent ink graffiti, from painted surfaces.

BACKGROUND OF THE INVENTION

General methods for dealing with graffiti fall into on of three categories: removal by an abrasive method (such as sandblasting), chemical removal, or repainting over the graffiti. These methods are described in detail by Leys in U.S. Pat. No. 5,346,640. As noted in the patent, each method has its disadvantages in terms of cost, labor and environmental impact. Leys, the disclosure of which is incorporated herein by reference, proposes to provide graffiti removers based on N-methyl-2-pyrrolidone, propylene carbonate, isocetyl alcohol, a glycol ether ester, a surfactant and a thickener. The reference teaches that permanent marker inks, as well as spray paints can be removed, and mentions that, in some of the above listed, dimethyl sulfoxide in an amount of between about 10 and about 30 percent is useful to help remove heavy old graffiti and underlying paint from all surfaces except plastic.

Pourreau, U.S. Pat. No. 5,712,234, describes graffiti removers particularly useful for removing permanent ink from painted surfaces which include a dye solvent (a pyrrolidine or lactone), a dye non-solvent (a glycol ether ester or a glycol diether), and a dye bleaching agent. It is mentioned in this reference that the dye bleaching agent (which comprise difficult to handle oxidizing agents, reducing agents and bases) are keys to success, and further that optional components that can be included comprise thickeners, surfactants and the like. Specifically mentioned is the use of water in a final step to remove both graffiti and the cleaner composition from the painted surface.

Jackson, U.S. Pat. No. 4,780,235, describes a low toxicity paint remover composition containing $C_1$ to $C_4$ dialkyl esters of $C_4$ to $C_6$ aliphatic dibasic acid, an activator, a thickener, a surfactant and at least one other organic nonhalogen-containing solvent. It is mentioned in this reference that the activator is a key ingredient and typically is a difficult-to-handle-base (ammonium hydroxide or monoethanolamine) or -acid (formic acid, acetic acid or oxalic acid), some of which smell badly and some of which are toxic. None of the nonhalogen-containing solvents specifically mentioned include sulfones and sulfoxides, especially not mentioned is dimethyl sulfoxide. Among the thickeners specifically mentioned are effective amounts, in general, between about 0.5 and 10 wt. % of ethylcellulose, hydroxypropyl cellulose, organic modified clay and hydrogenated castor oil.

Still needed in the art are graffiti removers that will effectively remove stains of an organic nature, especially permanent inks and dyes from painted surfaces without harming the underlying surfaces, without using harsh chemicals as activators and/or dye bleaching agents, which operate slowly, allowing a more concentrated attack, but efficiently, even on vertical surfaces, and which are cleanable by rinsing with water.

The present invention is based on the discovery that if a suitable filler is used in combination with an active solvent and a secondary solvent, graffiti removers can be developed which are efficient to remove stains that are organic in nature from a variety of surfaces employing very mild solvents in compositions that are relatively environmentally friendly when compared to those which are now known in the art. While not intending to be bound by any theory of action, the filler appears to hinder solvent evaporation into the air, thus allowing it to fully attack the graffiti or stain, and without the side effect of destroying most of the surfaces on which it is applied.

SUMMARY OF THE INVENTION

According to the present invention, there are provided graffiti removers having hydrophobic characteristics, low chemical reactivity and low oil absorption, which comprise:

(a) from about 6.5 to about 30.0 wt. % of an active oxygenated organic halogen- and sulfur-free solvent selected from the group consisting of short chain aliphatic diacid esters, pyrrolidones, butyl carbitol, di-(lower)alkyl ether/esters or di(lower) alkyl ethers of di(lower)alkylidene glycols, or a mixture of any of the foregoing;

(b) from about 0.0 to about 30 wt. % of a secondary solvent selected from the group consisting of an organic sulfone, an organic sulfoxide, a high molecular weight alcohol, a primary, secondary or tertiary amine, or a mixture of any of the foregoing;

(c) from about 5.0 to about 50 wt % of an emollient selected from the group consisting of high molecular weight fatty acids, oleic acid, high molecular weight fatty acid amides, and a mixture of any of the foregoing; and (d) from about 25.0 to about 50.0 wt. % of an amorphous particulate filler selected from the group consisting of aluminum silicates, kaolin clay, magnesium silicates, talc, barium sulfates, calcium carbonates, silicas, mica, wollastonite, and mixtures of any of the foregoing.

Also contemplated by the present invention is a process comprising applying to a graffiti-marked surface a graffiti remover as defined above in an amount effective to allow subsequent removal of the graffiti from the surface.

DETAILED DESCRIPTION OF THE INVENTION

The graffiti removers of the present invention contain an active, primary solvent, optionally coupled with a secondary solvent that allows the primary solvent to be fully reactive in removing the unwanted stain from different substrates. Furthermore, these active solvents are protected from further dilution or evaporation with an inert filler that entraps the solvent while allowing a gradual leakage of the active solvent for stain removal. Additionally, the filler also supplies abrasive properties to the cleaner to assist in stain removal. The graffiti removers of the invention also contains an emollient that coats the protective filler mentioned above, allowing it to be uniformly rubbed over the unwanted stain without drying or agglomerating.

The graffiti removers of the present invention comprises three and, optionally, four key ingredients, each in effective amounts: (a) an active solvent, (b) an optional secondary solvent; (c) an emillient; and (d) a filler. Preferably, the respective amounts will range from 10.0 to 15.0 wt. % of (a), and, more preferably, from 11.0 to 13.0 wt. % of (a); from 10.0 to 15.0 wt. % of optional (b), and, more preferably, from 11.0 to 13.0 wt. % of (b); from 25.0 to 40.0 wt. % of (c), and, more preferably, from 32.0 to 36.0 wt. % of (c); and from 35.0 to 45.0 wt. % of (d), and, more preferably, from 38.0 to 42.0 wt. % of (d). Although the graffiti removers can vary widely in wt. % composition as set forth above, special mention is made of composition comprising about 23 wt. % of active solvent (a); about 23 wt. % of secondary solvent (b); about 23 wt. % of emollient (c); and about 31 wt. % of filler (d).

With respect to the type of compound used, a preferred active solvent (a) comprises a mixture of lower alkyl, e.g., methyl, propyl, butyl, esters of short chain aliphatic diacids, e.g., succinic, adipic, glutaric, etc. Other active solvents that can be sued are, for example, butyl carbitol; N-Methyl-2-pyrrolidone, diethylene glycol, monoethyl ether acetate, dipropylene glycol, monomethyl ether acetate, diethylene glycol diethyl ether, and obviously equivalent non-halogenated, non-sulfur-containing oxygenated organic solvents. These active solvents are the primary ingredient for attacking the stain, plasticizing it and destroying the adhesion force of the stain to the bonding substrate. Especially preferred as an active solvent is an admixture of dimethyl glutarate, dimethyl adipate and dimethyl succinate, special mention being made of 66 wt. % of dimethyl glutarate, 17 wt. % of dimethyl adipate, and 17 wt. % of dimethyl succinate.

With respect to the type of compound used, a preferred, optional secondary solvent (b) comprises a member of the sulfone and/or the sulfoxide family, such as dimethyl sulfoxide, mainly because of their hygroscopic properties, permitting a more concentrated attack of the active solvent on the stain without water dilution. Further more, solvents such as dimethyl sulfoxide are exceptionally efficient at soluting cationic materials, such as salts, molybdate oranges and carbon black, found in inorganic pigments and dyes. Other secondary solvents that can be used in the graffiti removers of the present invention are high molecular weight alcohols, primary, secondary, or tertiary organic amines, and the like. Special mention is made of the use of dimethyl sulfoxide as secondary solvent (b).

With respect to the type of compound used, a preferred emollient (c) comprises oleic acid because it has excellent lubricity, availability, and compatibility with many different fillers (d). However, many other compounds, such as high molecular weight (e.g., >35) organic compounds, such as, fatty acids, fatty acid amides, and fatty alcohols will also function as suitable emollients.

With respect to the type of compound used, a preferred amorphous filler (d) comprises kaolin clay or aluminum silicates, because it is environmentally benign, readily available, has low chemical reactivity, is hydrophobic and has a moderate oil absorption (30 to 50 g/100 g). Kaolin clay absorbs and releases the solvents (a) and (b) while supplying a viscosity that is conductive for application to vertical surfaces such as walls where graffiti is generally found. Other fillers that work in the graffiti removers of the present invention include magnesium silicates or talcs ($3MgO.4SiO_2.H_2O$), barium sulfates ($BaSO_4$), calcium carbonates ($CaCO_3$), silicas ($SiO_2$), micas ($K_2O.3Al_2O_3.6SiO_2.2H_2O$), and wollastonite ($CaSiO_3$).

The filler, especially the sodium calcium silico-aluminates act as microlitic zeolites assisting in the scavenging and containing of the pigment, and/or inks that are removed upon cleaning with the graffiti remover. These zeolites are extremely effective as absorbents and drying agents, for such things as lead based paints while providing a means of containing any of such paint for proper disposal.

The graffiti removal compositions of the invention are readily prepared by mixing the ingredients specified in closed containers, following standard industrial procedures.

To remove graffiti stains on an immediate basis, the graffiti remover of the invention is applied to the stain and rubbed with a sponge, brush, or the like, to soften the stain and then the cleaner and the stain are washed off with water or a damp sponge.

To remove difficulty removable graffiti, the graffiti remover of the invention is applied to the stain and allowed to stand overnight, or linger, depending on the stain. Thereafter the cleaner and the stain are removed by rinsing with high pressure water, rubbing with damp sponges, brushes, or the like.

On those occasions when it may be necessary to allow the graffiti remover of the invention to reside on the stain for longer than 16 hrs., an additional application of the graffiti remover followed by a water rinse can be sued, but caution is required not to do this routinely because the underlying paint might be dulled. In addition, it is preferred to make sure the surface is dry before applying the graffiti remover of the invention, because water on the surface can weaken its cleaning ability.

In comparison with prior art cleaners using active solvents such as mineral spirits, toluene, xylene and the like, the graffiti removers of the present invention generally require only one-tenth the amount to remove the same stains.

DESCRIPTION OF THE PREFERRED EMBODIMENT

The invention is illustrated by the following examples.

EXAMPLE

The following ingredients are mixed in a closed container:

22 parts by weight dibasic ester (containing about 17 wt. % of dimethyl succinate, 66 wt % of dimethyl glutarate, and 17 wt. % of dimethyl adipate)

25 parts by weight of dimethyl sulfoxide 22 parts by weight of oleic acid 31 parts by weight of kaolin clay Paint Removal Results The composition obtained from the EXAMPLE is tested for its ability to remove permanent ink graffiti from painted surfaces, as follows:

Substrates comprising 4 inch×8 inch cold rolled steel Q-Panels are surface prepared for testing by sandblasting, then are spray coated with 4.0 mil DFT (dry film thickness) of a freshly mixed primer composition comprising 100 parts of A and 22 parts of B of the following formulations (See, Smith et al, U.S. Pat. No. 5,736,249, Example 1):

|  | Parts by Weight |
| --- | --- |
| Component A |  |
| Epoxy silicone based emulsion | 40 |
| 2-Propoxy ethanol | 4 |
| Water | 56 |
| Component B |  |
| Polyamines solution | 55 |
| 2-Propoxy ethanol | 30 |
| Methyl alcohol | 15 |

This coat is cured at 23° C. for 24 hours, then is spray coated to 4.0 mils DFT with a freshly mixed pigmented composition comprising 100 parts of A, 8.75 parts of X and 17.5 parts of B of the following formulations:

|  | Parts by Weight |
| --- | --- |
| Component A |  |
| Epoxy silicone based emulsion | 54 |

-continued

|  | Parts by Weight |
| --- | --- |
| 2-Propoxy ethanol | 5 |
| Water | 41 |
| Component B |  |
| Polyamines solution | 55 |
| 2-Propoxy ethanol | 30 |
| Methyl alcohol | 15 |
| Component X |  |
| Propanol | 0.50 |
| Methanol | 0.25 |
| Pigment (Blue) | 13.00 |
| Water | 86.25 |

This coat is cured at ambient temperature, minimum 20° C. for 7 days to produce a substrate having thereon a smooth uniform pigmented coating.

Each of the painted substrate panels are stained, respectively with graffiti from cans of acrylic paint, spray cans and magic markers containing permanent ink and such cans and markers containing removable ink, carbon black-filled styrene/butadiene rubber, pressure sensitive adhesives containing such rubber, cans of oil-based alkyd resins, wax-based crayons, lipstick, and tar. The panels are tested for ease of cleanup.

The composition of the EXAMPLE above is applied with a sponge, brush or towel to portions of the panels set forth above. For comparison purposes, a state of the art graffiti remover based on methylene chloride is applied by sponge, brush or towel to other portions of the same surfaces. After standing from 5 minutes to 16 hours, the panels are cleaned with a wet sponge and rinsed with clean water. In all cases the composition and imbided stains of the present invention is removed in an environmentally-friendly way with only a minor reduction in gloss on the underlying substrate, if the substrate comprises an oil-base painted "EXIT" sign.

The graffiti comprised on permanent maker and spray pint have been removed from all surfaces. The use of the composition of the above EXAMPLE maintains a safe environment. The composition of the above EXAMPLE contains no methylene chloride, or mineral spirits, and does not require an activator or a dye bleaching agent.

The above-identified patents are incorporated herein by reference.

Many variations of the present invention will suggest themselves to those skilled in this art in light of the above, detailed description. For example, the diemthyl sulfoxide can be omitted or replaced by another secondary solvent, and the secondary solvent can be omitted altogether. Instead of kaolin, the filler can comprise colloidal silica, calcium carbonate, mica or the like. The important thing in any such substitution is to make certain that the overall composition retains its hydrophobic character, low chemical reactivity and low oil absorption. All such obvious variations are within the full intended scope of the appended claims.

What I claim and desire to secure by Letters Patent is:

1. A graffiti remover having hydrophobic characteristics, low chemical reactivity and low oil absorption, which comprises:
    (a) from about 6.5 to about 30.0 wt. % of an active oxygenated organic halogen- and sulfur-free solvent which is a mixture of short chain aliphatic diacid esters;
    (b) from about 0.0 to about 30 wt. % of a secondary solvent selected from the group consisting of an organic sulfone, an organic sulfoxide, an alcohol, a primary, secondary or tertiary amine, and a mixture of any of the foregoing;
    (c) from about 5.0 to about 50 wt % of an emollient selected from the group consisting of a fatty acid, a fatty acid amide, and a mixture of either of the foregoing; and
    (d) from about 25.0 to about 50.0 wt. % of an amorphous particulate filler selected from the group consisting of aluminum silicates, kaolin clay, magnesium silicates, talc, barium sulfates, calcium carbonates, silicas, mica, wollastonite, and a mixture of any of the foregoing.

2. A graffiti remover as defined in claim 1 wherein the active solvent (a) is an admixture of dimethyl succinate, dimethyl glutarate and dimethyl adipate.

3. A graffiti remover as defined in claim 1 wherein the secondary solvent, (b), when present, is dimethyl sulfoxide.

4. A graffiti remover as defined in claim 1 wherein the emollient (c) is oleic acid.

5. A graffiti remover as defined in claim 1 wherein the filler (d) is amorphous kaolin.

6. A graffiti remover as defined in claim 1 comprising from bout 10.0 to about 15.0 wt. % of the active solvent (a), from about 10.0 to about 15.0 wt. % of the secondary solvent (b), from about 25.0 to about 40.0 wt. % of the emollient (c), and from about 35.0 to about 45.0 wt. % of the filler (d).

7. A graffiti remover which comprises:
    (a) from about 11.0 to about 13.0 wt. % of an active solvent which consists essentially of a mixture of short chain aliphatic diacid esters;
    (d) from about 11.0 to about 13.0 wt. % of a secondary solvent which consists essentially of diemthyl sulfoxide;
    (c) from about 32.0 to about 36.0 wt. % of an emollient which consists essentially of a fatty acid; and
    (d) from about 38.0 to about 42.0 wt. % of an amorphous filler which consists essentially of amorphous kaolin.

8. A method which comprises applying to a graffiti-marked surface the graffiti remover of claim 1 in an amount effective to allow subsequent removal of the graffiti from the surface.

9. A method which comprises removing permanent ink graffiti from a painted surface without substantially altering the surface by treating the surface with a graffiti remover which comprises:
    (a) from about 6.5 to about 30.0 wt. % of an active oxygenated organic halogen- and sulfur-free solvent which is a mixture of short chain aliphatic diacid esters;
    (b) from about 0.0 to about 30 wt. % of a secondary solvent selected from the group consisting of an organic sulfone, an organic sulfoxide, an alcohol, a primary, secondary or tertiary amine, and a mixture of any of the foregoing;
    (c) from about 5.0 to about 50 wt % of an emollient selected from the group consisting of a fatty acid, a fatty acid amide, and a mixture of either of the foregoing; and
    (d) from about 25.0 to about 50.0 wt. % of an amorphous particulate filler selected from the group consisting of aluminum silicates, kaolin clay, magnesium silicates, talc, barium sulfates, calcium carbonates, silicas, mica, wollastonite, and a mixture of any of the foregoing.

10. The method of claim 9 wherein the graffiti and graffiti remover are rinsed from the treated surface with water.

* * * * *